US012796595B2

(12) United States Patent
Racchella

(10) Patent No.: US 12,796,595 B2
(45) Date of Patent: Nov. 17, 2026

(54) AGRICULTURAL HEADER WITH DOUBLE KNIFE CUTTING SYSTEM

(71) Applicant: AGCO International GmbH, Neuhausen (CH)

(72) Inventor: Fabio Racchella, Breganze (IT)

(73) Assignee: AGCO International GmbH, Neuhausen (CH)

( * ) Notice: Subject to any disclaimer, the term of this patent is extended or adjusted under 35 U.S.C. 154(b) by 361 days.

(21) Appl. No.: 18/627,531

(22) Filed: Apr. 5, 2024

(65) Prior Publication Data

US 2024/0365703 A1 Nov. 7, 2024

(30) Foreign Application Priority Data

May 5, 2023 (EP) .................................... 23425018

(51) Int. Cl.
*A01D 34/135* (2006.01)
*A01D 34/30* (2006.01)

(52) U.S. Cl.
CPC ........... *A01D 34/135* (2013.01); *A01D 34/30* (2013.01)

(58) Field of Classification Search
CPC ....... A01D 34/135; A01D 34/30; A01D 34/14
See application file for complete search history.

(56) References Cited

U.S. PATENT DOCUMENTS 2,569,507 A * 10/1951 Frederick .................. F15B 7/02 92/75
3,010,268 A * 11/1961 Freeman .............. A01D 34/135 56/297
3,098,338 A * 7/1963 Myers .................... A01D 34/17 56/307
3,508,388 A * 4/1970 Buchholz ............... A01D 34/13 56/297
4,246,742 A * 1/1981 Clark ................... A01D 34/135 56/297
4,805,390 A * 2/1989 Majkrzak .............. A01D 34/14 56/300
5,161,357 A * 11/1992 Braunberger .......... A01D 34/14 403/312

(Continued)

FOREIGN PATENT DOCUMENTS

WO WO-2012166721 A1 * 12/2012 ........... A01D 34/145

OTHER PUBLICATIONS

UK Intellectual Property Office, Search Report for related UK Application No. GB2315934.6, dated Apr. 2, 2024, 3 pages.

*Primary Examiner* — Arpad Fabian-Kovacs

(57) ABSTRACT

A sickle header has a cutter bar having a mounting plate extending along the cutter bar, a top cutter bar assembly mounted to reciprocate in a side-to-side motion relative to the mounting plate, the top cutter bar assembly having an elongate top knife bar mounted on a top slide plate. The cutter bar has a bottom cutter bar assembly mounted to reciprocate in a side-to-side motion relative to the mounting plate, the bottom cutter bar assembly having an elongate bottom knife bar mounted on a bottom slide plate. The top and bottom knife bars have a row of knife sections and oppositely facing adjacent knife sections of the top and bottom knife bars effect a cutting action as the cutter bar assemblies are reciprocatingly moved sidewardly. The cutter bar has a sickle drive mechanism configured to drive the cutter bar assemblies in opposite sideways directions.

4 Claims, 5 Drawing Sheets

(56) References Cited

U.S. PATENT DOCUMENTS

| | | | | |
|---|---|---|---|---|
| 2007/0169599 | A1 * | 7/2007 | Mace | A01D 34/14<br>83/13 |
| 2012/0311988 | A1 * | 12/2012 | Johnson | A01D 34/14<br>56/298 |
| 2015/0305233 | A1 * | 10/2015 | Surmann | A01D 34/14<br>56/10.1 |
| 2017/0127609 | A1 | 5/2017 | Dunn et al. | |
| 2020/0214197 | A1 * | 7/2020 | Schaffer | A01D 34/14 |
| 2022/0400608 | A1 * | 12/2022 | Missotten | A01D 34/14 |
| 2022/0408636 | A1 * | 12/2022 | Schaffer | A01D 34/14 |
| 2023/0013518 | A1 * | 1/2023 | Blank | A01D 34/14 |
| 2024/0065145 | A1 * | 2/2024 | Wepfer | A01D 34/17 |

* cited by examiner

AGRICULTURAL HEADER WITH DOUBLE KNIFE CUTTING SYSTEM

BACKGROUND

Field of Invention

This invention relates generally to a header for a plant cutting machine such as a combine or a windrower, and more particularly, to a sickle of the header.

Description of Related Art

Agricultural combines are used to harvest crop material with a harvesting header used to cut the crop material has the combine harvester moves through a field. One type of harvesting header is a sickle header that has a cutter bar with knife assembly having a number of teeth that are moved in a linear oscillating fashion and an array of stationary guards that project forwardly at sidewardly spaced intervals. The guards have sidewardly facing aligned slots through which the knife assembly is received. The teeth, in conjunction with adjacent guards, effect a shearing or cutting action which severs plant stems and stalks captured between the teeth and the guards as the knife assembly is reciprocatingly moved sidewardly.

One problem with sickle headers is small stones can become picked up by the cutter bar, especially on headers that are used to work close to the ground and thus more susceptible to collecting stone between the cutting teeth and guards. The stones may become entrapped between the teeth and the guards causing broken teeth or may be ejected into the crop stream and ingested into the combine harvester.

It would be desirable to have a cutter bar for a harvesting header that discourages stones from becoming entrapped on the current header.

BRIEF SUMMARY

In one aspect, the invention is directed to a sickle header having an elongate cutter bar along a forward edge of the sickle header. The cutter bar includes a mounting plate extending a length of the cutter bar, a top cutter bar assembly mounted to reciprocate in a side-to-side motion relative to a forward portion of the mounting plate, the top cutter bar assembly having an elongate top knife bar mounted on a top slide plate. The top knife bar has a row of knife sections having angularly related cutting edges. The cutter bar has a bottom cutter bar assembly mounted to reciprocate in a side-to-side motion relative to the forward portion of the mounting plate, the bottom cutter bar assembly having an elongate bottom knife bar mounted on a bottom slide plate. The bottom knife bar has a row of knife sections having angularly related cutting edges such that the oppositely facing adjacent knife sections of the top and bottom knife bars effect a cutting action which severs plant stems and stalks captured between the cutting edges as the top and bottom cutter bar assemblies are reciprocatingly moved sidewardly. The cutter bar has a spring mechanism connected to the mounting plate causing a downward biasing force on the top slide plate and a spring mechanism connected to the mounting plate causing an upwards biasing force on the bottom slide plate such that the top and bottom cutter bar assemblies are forced toward each other separated by the mounting plate. The cutter bar has a sickle drive mechanism configured to drive the top and bottom cutter bar assemblies, the sickle drive mechanism having a rotatable flywheel and an upper crank mounted on a first side of the flywheel and a bottom crank mounted on a second side of the flywheel opposite the first side. The upper crank drives the top cutter bar assembly such that the top slide plate slides along the mounting plate as the flywheel rotates, and the bottom crank drives the bottom cutter bar assembly such that the bottom slide plate slides along the mounting top slide plate to move the top and bottom cutter bar assemblies in opposite sideways directions.

Other technical features may be readily apparent to one skilled in the art from the following figures, descriptions, and claims. This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
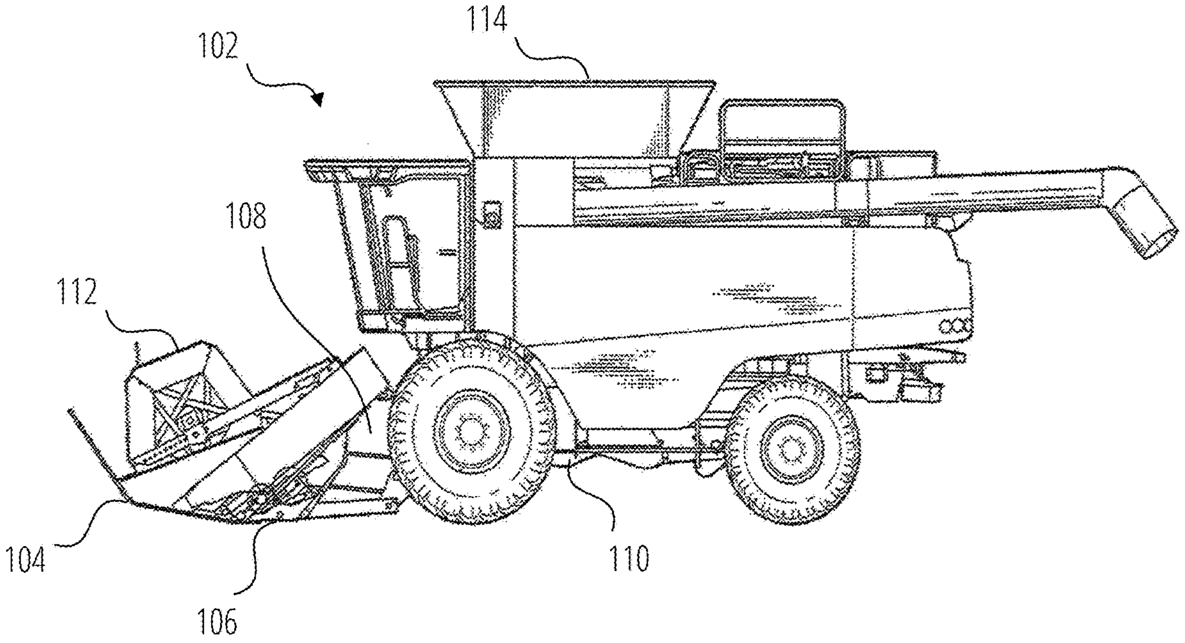
FIG. 1 is a schematic diagram that illustrates a side perspective view of an agricultural machine in which an embodiment of an example sickle header may be implemented.

Certain embodiments of a sickle header and associated systems and methods are disclosed that enable both the harvesting of grain by an agricultural machine (hereinafter, a combine harvester used as an illustrative example) to which the sickle header is coupled. In one embodiment, the sickle header is configured as a grain header, and comprises a frame that houses a cutter bar comprising a plurality of knives (e.g., oscillating knives). The plane of operation of the cutter bar may be independently adjusted based on the type and/or height of the crops in a field.

Having summarized certain features of a sickle header of the present disclosure, reference will now be made in detail to the description of the disclosure as illustrated in the drawings. While the disclosure will be described in connection with these drawings, there is no intent to limit it to the embodiment or embodiments disclosed herein. For instance, though emphasis is placed on a combine harvester with a front-coupled header, some embodiments may use other configurations of a combine harvester (e.g., not self-propelled) or other agricultural machines. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description. Note that references hereinafter made to certain directions, such as, for example, "front", "rear", "top" and "bottom", are made as viewed from the rear of the combine harvester looking forwardly.

Turning now to FIG. 1, an example agricultural machine combine harvester 102 on which an embodiment of an example header 104 may be implemented is illustrated. The agricultural machine 102 may be a combine harvester and is shown equipped with the header 104 configured as a sickle header. One having ordinary skill in the art should appreciate in the context of the present disclosure that the example combine harvester 102 is merely illustrative, and that other machines that utilize the sickle header 104 may be used. Further, though illustrated as a draper-style sickle header 104, other header designs may be used that incorporate the relevant features of the sickle header 104. The example combine harvester 102 is shown in FIG. 1 harvesting crops in a field as it traverses the field. The sickle header 104 couples directly or indirectly (e.g., via a lateral tilt header frame 106) to a feeder house 108 of the combine harvester 102 in conventional manner. The feeder house 108 may be raised by one or more hydraulic cylinders (not shown) coupled between the feeder house 108 and a chassis 110 of the combine harvester 102, which in turn enables the raising and lowering of the sickle header 104. One or more additional hydraulic cylinders may also be used to enable tilting (e.g., rolling, etc.) of the sickle header 104. In one embodiment, the sickle header 104 comprises adjustable reels 112 that are respectively coupled to a plurality of tine or fork bars (not shown) that rotate to cause crop to be forced against a cutter bar (obscured from view in FIG. 1) as is known.

In general, and using the harvesting of tall crops as an illustrative example, the sickle header 104 of the combine harvester 102 cuts a first portion (e.g., primarily the heads of the plants of the crops, and a small portion beneath the heads comprising material other than grain (MOG)) of each plant of the crops, and the cut first portion is delivered (e.g., via the draper conveyors or one or more augers) to a centralized, rear opening of the sickle header 104 leading to the front end of the feeder house 108. In the feeder house 108, the cut, first portion of crop materials are moved upwardly and rearwardly within until reaching a processor comprising a thresher rotor (obscured from view in FIG. 1). In one embodiment, the thresher rotor may comprise an axial-based, single or twin rotor design such as that found in an IDEAL Combine by AGCO Corp. However, other combine designs may be used, such as a single, transverse rotor, such as that found in a Gleaner Super Series Combine by AGCO Corp. The thresher rotor processes the crop materials in known manner and passes any non-grain portion of the crop material (e.g., heavier chaff, corn stalks, etc.) toward the rear of the combine harvester 102 and any remaining portion (e.g., grain and possibly light chaff) through a cleaning process in known manner. In general, the sickle header 104 minimizes the amount of MOG that enters the threshing unit. In the processor, the crop materials undergo threshing and separating operations. In other words, the crop materials are threshed and separated by the thresher rotor operating in cooperation with well-known foraminous processing members in the form of threshing concave assemblies and separator grate assemblies, with the grain (and possibly light chaff) escaping through the concave assemblies and the grate assemblies and to a cleaning system located beneath the processor to facilitate the cleaning of the heavier crop material. The cleaned grain that drops to the bottom of the cleaning system is delivered by a conveying mechanism that transports the grain to a well-known elevator mechanism (not shown), which conveys the grain to a grain bin 114 located at the top of the combine harvester 102. Any remaining chaff and partially or unthreshed grain is recirculated through the processor via tailings return conveying mechanism.

Figure 2:
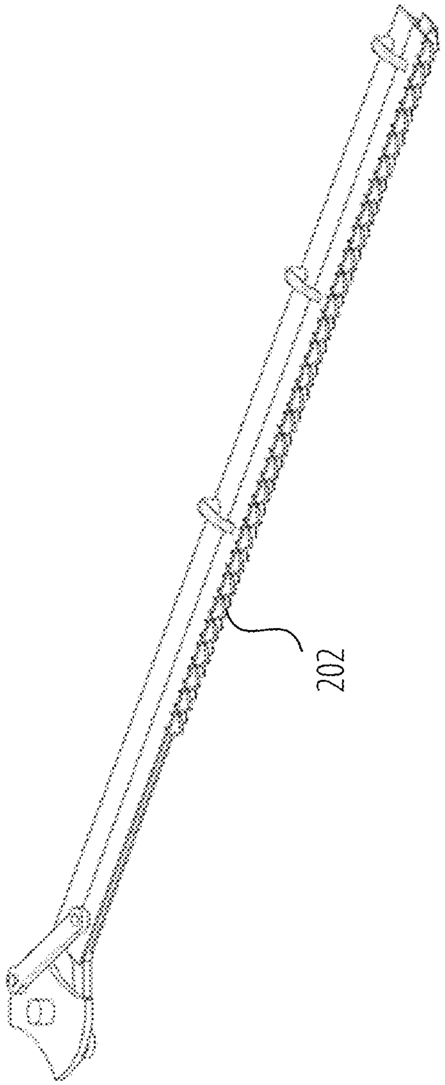
FIG. 2 illustrates an aspect of the subject matter in accordance with one embodiment.

Referring now to FIG. 2, the sickle header 104 of FIG. 1 includes an elongate cutter bar 202 along a forward edge of the sickle header 104 that extends in a transverse direction along the width of combine harvester 102. As is known in the art, the cutter bar 202 is operable for severing the crop for induction into combine harvester 102.

Figure 3:
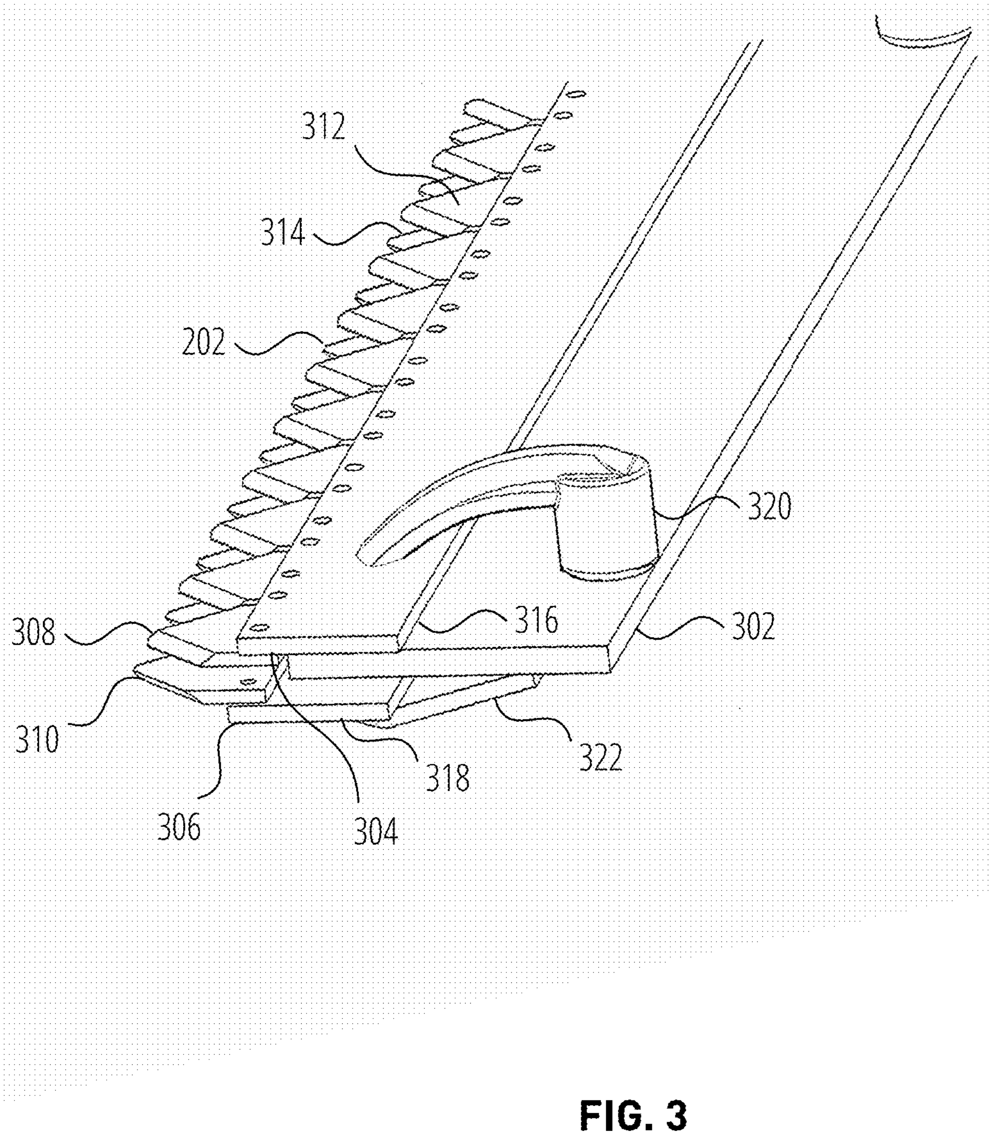
FIG. 3 illustrates an aspect of the subject matter in accordance with one embodiment.

As better seen in the enlarged view in FIG. 3, the cutter bar 202 has a mounting plate 302 mounted on the header frame 106 of the sickle header 104 and substantially extends the length of the cutter bar 202. The illustrated embodiment of the cutter bar 202 has a top cutter bar assembly 304 and a bottom cutter bar assembly 306, each mounted to reciprocate in a side-to-side motion relative to a forward portion of the mounting plate 302. The top cutter bar assembly 304 has an elongate top knife bar 308 and the bottom cutter bar assembly 306 has an elongate bottom knife bar 310. Desirably, the top and bottom cutter bar assemblies 304 and 306 are essentially of identical construction. The top and bottom cutter bar assemblies 304 and 306 include a row of oppositely facing knife sections 312 having angularly related, serrated cutting edges 314. The knife sections 312 of the top cutter bar assembly 304 are mounted on a top slide plate 316 and the knife sections 312 of the bottom cutter bar assembly 306 are mounted on a bottom slide plate 318, such that the oppositely facing adjacent knife sections 312 effect a shearing or cutting action which severs plant stems and stalks captured between the cutting edges 314 as the top and bottom cutter bar assemblies 304 and 306 are reciprocatingly moved sidewardly. Knife sections 312 are attached to the top and bottom slide plates 316 and 318 with suitable fasteners as known in the art. A spring mechanism 320 connected to the mounting plate 302 effects a downwards biasing force on the top slide plate 316. A spring mechanism 322 connected to the mounting plate 302 effects an upwards biasing force on the bottom slide plate 318. Accordingly, the top and bottom cutter bar assemblies 304 and 306 are forced toward each other separated by the mounting plate 302.

Figure 4:
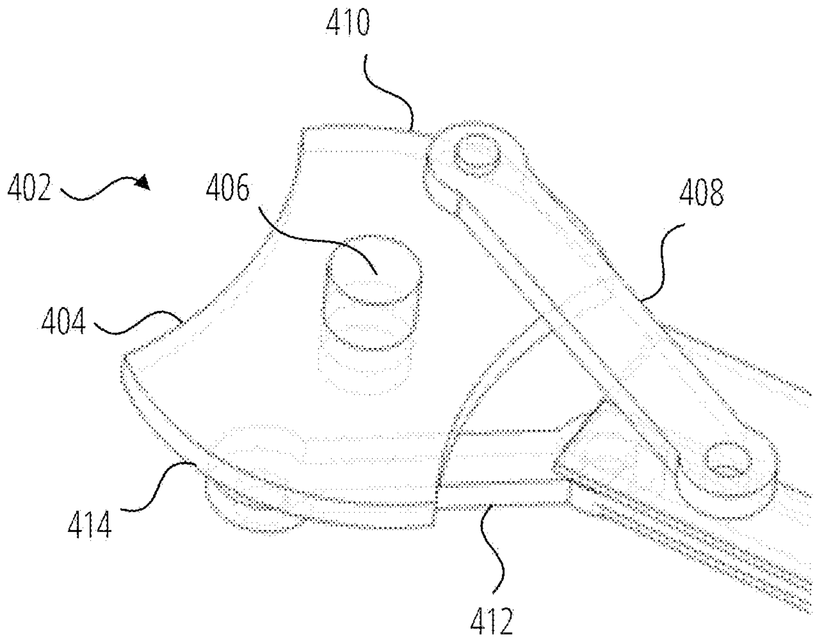
FIG. 4 illustrates an aspect of the subject matter in accordance with one embodiment.

Turning now to FIG. 4, a sickle drive mechanism 402 is connected in driving relation with the top and bottom cutter bar assemblies 304 and 306. In one embodiment, sickle drive mechanism 402 includes a rotatable flywheel 404 driven by a suitable power source (not shown) in any suitable conventional manner for rotating the flywheel 404 about a pivot 406. The flywheel 404 has an upper crank 408 mounted on a first side 410 and a bottom crank 412 mounted on a second side 414 of the flywheel 404 opposite the first side 410. The upper crank 408 drives the top cutter bar assembly 304 such that the top slide plate 316 slides along the mounting plate 302 in a reciprocating manner as the flywheel 404 rotates, and the bottom crank 412 drives the bottom cutter bar assembly 306 such that the bottom slide plate 318 slides along the mounting top slide plate 316 in a reciprocating manner. As the flywheel 404 rotates about pivot 406, the cranks 408 and 412 move the respective top and bottom cutter bar assemblies 304 and 306 in opposite directions to enable a cutting action between the top knife bar 308 and bottom knife bar 310. That is, as the top knife bar 308 of the top cutter bar assembly 304 is moved in one sideways direction, the bottom knife bar 310 of the bottom cutter bar assembly 306 will be moved in the opposite sideways direction. The length of the sideward movements, or strokes, will be sufficient for providing the desired cutting action, which will typically at least be equal to about the sideward extent of a cutting edge 314 of a typical knife section 312, Here, it should be noted that it is desired for the top and bottom cutter bar assemblies 304 and 306 to move only in the sideward directions relative to the mounting plate 302, and not forwardly, rearwardly, upwardly or downwardly to any significant extent relative thereto. This is achieved at least in part by the containment of top and bottom cutter bar assemblies 304 and 306 with spring mechanisms 320 and 322, although other constructions for holding the cutter bar assemblies could be used.

Figure 5:
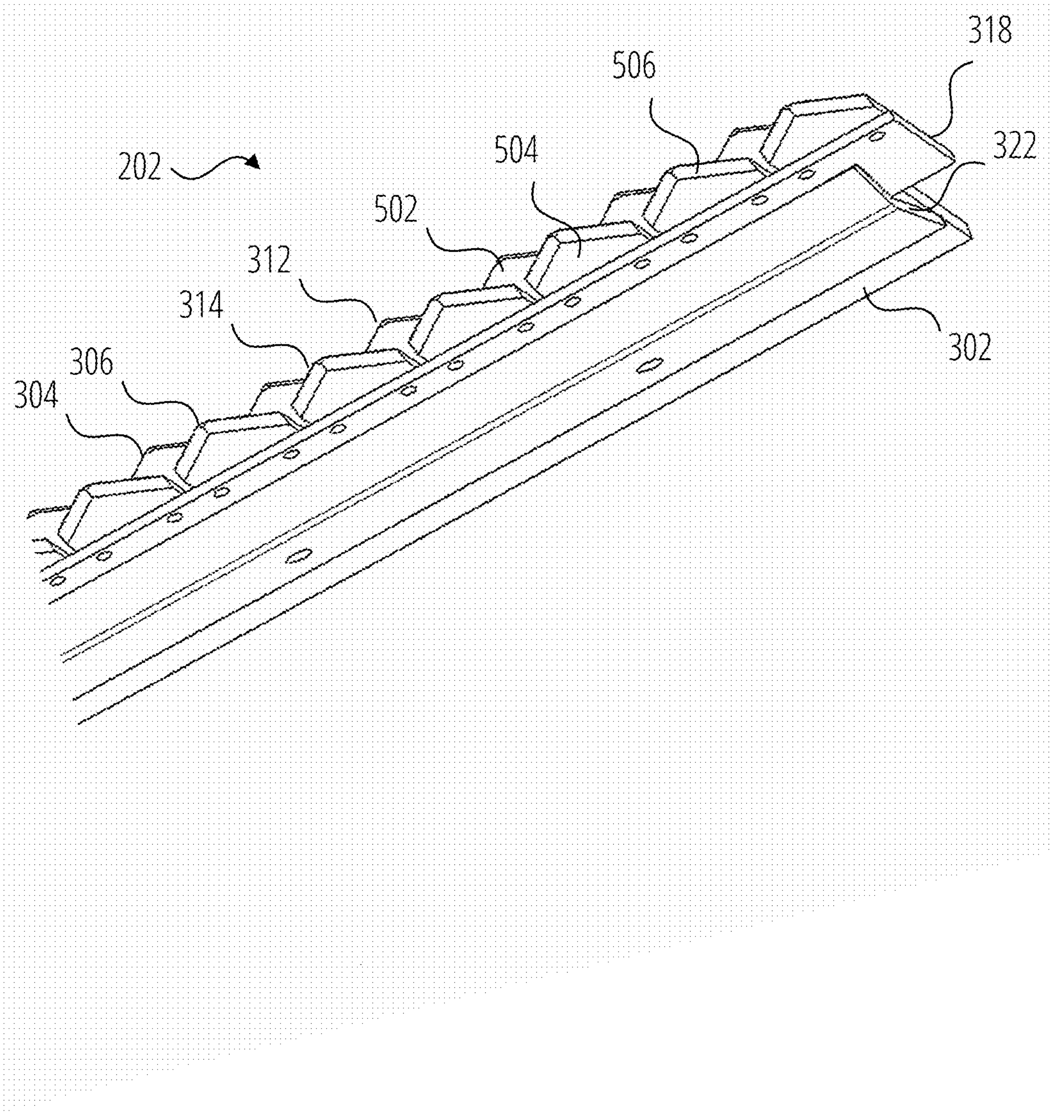
FIG. 5 illustrates an aspect of the subject matter in accordance with one embodiment.

Turning now to FIG. 5, each knife section 312 is shaped such that it has a primary surface 502 and an opposed secondary surface 504 with the cutting edge 314 formed by an angled surface 506 sloping from the primary surface 502 to the secondary surface 504. The primary surface 504 has a larger surface area than a surface area of the secondary surface 504. The knife sections 312 in the top knife bar 308 and bottom knife bar 310 are arranged such that the primary surfaces 502 of the knife sections 312 in the top knife bar 308 face the primary surfaces 502 of the opposing knife sections 312 in the bottom knife bar 310.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A sickle header including an elongate cutter bar along a forward edge of the sickle header, the cutter bar comprising:

a mounting plate extending a length of the cutter bar;

a top cutter bar assembly mounted to reciprocate in a side-to-side motion relative to a forward portion of the mounting plate, the top cutter bar assembly having an elongate top knife bar mounted on a top slide plate, the top knife bar having a row of knife sections having angularly related cutting edges;

a bottom cutter bar assembly mounted to reciprocate in a side-to-side motion relative to the forward portion of the mounting plate, the bottom cutter bar assembly having an elongate bottom knife bar mounted on a bottom slide plate, the bottom knife bar having a row of knife sections having angularly-related cutting edges such that the oppositely facing adjacent knife sections of the top and bottom knife bars effect a cutting action which severs plant stems and stalks captured between the cutting edges as the top and bottom cutter bar assemblies are reciprocatingly moved sidewardly;

a first spring mechanism connected to the mounting plate causing a downward biasing force on the top slide plate;

a second spring mechanism connected to the mounting plate causing an upwards biasing force on the bottom slide plate such that the top and bottom cutter bar assemblies are forced toward each other separated by the mounting plate; and a sickle drive mechanism configured to drive the top and bottom cutter bar assemblies, the sickle drive mechanism having a rotatable flywheel and an upper crank mounted on a first side of the flywheel and a bottom crank mounted on a second side of the flywheel opposite the first side, wherein the upper crank drives the top cutter bar assembly such that the top slide plate slides along the mounting plate as the flywheel rotates, and the bottom crank drives the bottom cutter bar assembly such that the bottom slide plate slides along the mounting top slide plate to move the top and bottom cutter bar assemblies in opposite sideways directions.

2. The sickle header of claim 1 wherein each knife section is shaped such that it has a primary surface and an opposed secondary surface with the cutting edge formed by an angled surface sloping from the primary surface to the secondary surface.

3. The sickle header of claim 2 wherein the primary surface has a larger surface area than a surface area of the secondary surface.

4. The sickle of claim 3 the knife sections in the top knife bar and the bottom knife bar are arranged such that the primary surfaces of the knife sections in the top knife bar face the primary surfaces of the opposing knife sections in the bottom knife bar.

* * * * *